(12) United States Patent
Qiao et al.

(10) Patent No.: US 6,958,370 B1
(45) Date of Patent: Oct. 25, 2005

(54) CARBON-CONTAINING MATERIALS

(75) Inventors: Greg Guanghua Qiao, Brunswick (AU); David Henry Solomon, Officer (AU); Raymond Walter Shaw, New Gisborne (AU); Drago Dragutin Juric, Bulleen (AU)

(73) Assignee: The University of Melbourne, Victoria (AU)

( * ) Notice: Subject to any disclaimer, the term of this patent is extended or adjusted under 35 U.S.C. 154(b) by 0 days.

(21) Appl. No.: 09/937,201

(22) PCT Filed: Mar. 23, 2000

(86) PCT No.: PCT/AU00/00236

§ 371 (c)(1),
(2), (4) Date: Mar. 12, 2002

(87) PCT Pub. No.: WO00/56811

PCT Pub. Date: Sep. 28, 2000

(30) Foreign Application Priority Data

Mar. 23, 1999 (AU) ............................................. PP 9413

(51) Int. Cl.$^7$ .................................................. C08K 3/04

(52) U.S. Cl. ........................................ 524/495; 524/496

(58) Field of Search .................................. 524/495, 496

(56) References Cited

U.S. PATENT DOCUMENTS 4,806,290 A * 2/1989 Hopper et al. ................. 264/28

* cited by examiner

*Primary Examiner*—Edward J. Cain
(74) *Attorney, Agent, or Firm*—Andrus, Sceales, Starke & Sawall, LLP

(57) ABSTRACT

The invention relates to a composition suitable for the preparation of a carbon-containing material including: (i) a binder phase containing organic resin component or polymer composite; (ii) mesophase carbon; and (iii) optionally filler particles. The invention further relates to a method for preparing a carbon-containing material including the steps of: (a) mixing a binder phase containing an organic resin component or polymer composite with mesophase carbon and optionally filler particles; (b) curing the mixture; and (c) heating the cured mixture. The invention also provides an article which is wholly or partly manufactured from the carbon-containing material defined above.

49 Claims, 6 Drawing Sheets

CARBON-CONTAINING MATERIALS

This application is the U.S. national stage application of International Application PCT/AU00/00236 filed 23 Mar. 2000, which international application was published on 28 Sep. 2000, as International Publication WO 00/56811 in the English language. The International Application claims priority of Australian Patent Application PP9413 filed 23 Mar. 1999.

The invention relates to improved carbon-containing materials, methods for their preparation and articles manufactured from them, in particular steel fabrication equipment, electrodes in electrolytic cells used in aluminium production, refractories in high temperature furnaces and other engineering products.

Carbon bonded composite materials are finding increasing use as replacements for traditional ceramic composites. Such replacement usually results in greatly improved properties and processing ability. Examples can be found in a wide range of industries which include those manufacturing refractory products such as steel fabrication equipment and electrolytic cells used in aluminium production.

In the preparation of carbon bonded composites, an organic polymer phase is converted to a type of carbon during heating which usually progresses through various temperatures of up to 2000° C. These composites also generally contain carbon black fillers which are added to control rheological properties, assist in processing or improve mechanical properties. The physical state of the carbon may vary from fine particles to fibers and platelets.

Although this practice has been adopted for many years, the effect of carbon black on the organic polymer phase formation during curing and the carbon structure produced during pyrolysis has received little or no attention. We have now found that carbon black has a significant impact on the final formation of the carbon material from the polymer. In general, the porosity of the carbon material derived from polymer resin will increase when more carbon black is added. This porous structure results in low density and sub optimum mechanical properties. We have also found that other carbon sources such as pulverized graphite or carbon derived from pyrolysis of phenolic resins exhibit similar effects to carbon black.

Mesophase carbon was developed in the last few years for the purpose of making graphitic carbon at relative low temperatures of 2000 to 2500° C. Mesophase carbon may be derived synthetically from aromatic hydrocarbons or from petroleum pitch. Synthetic mesophase which can be derived from aromatic hydrocarbons such as naphthalene consists of up to 100% anisotropy, while mesophase derived from petroleum pitch usually has only up to 75% anisotropy. Synthetic mesophase was developed as a superior precursor to graphitisation and is extensively used in carbon fiber applications. Such materials are usually used as a binderless mould and application temperatures are generally more than 2000° C.

We have now found that when synthetic mesophase carbon derived from aromatic hydrocarbons is used as a filler in combination with an organic polymer binder that carbon materials having unexpected and improved properties are obtained. These carbon materials generally have a low porosity measured as a low surface area, high carbon yield, high composite density and good mechanical properties.

According to one aspect of the present invention there is provided a composition suitable for the preparation of a carbon-containing material including:

(i) a binder phase containing an organic resin component or a polymer composite;
(ii) synthetic mesophase carbon derived from aromatic hydrcarbons; and
(iii) optionally filler particles.

According to another aspect of the present invention there is provided a method for preparing a carbon-containing material including the steps of:

(a) mixing a binder phase containing an organic resin component or polymer composite with synthetic mesophase carbon derived from aromatic hydrocarbons and optionally filler particles;
(b) curing the mixture; and
(c) heating the cured mixture.

The term "organic resin component" is used herein in its broadest sense to denote low molecular weight polymerisable entities through to higher molecular weight entities containing many repeat units. The term includes monomers, dimers and oligomers.

A wide range of resin structures are possible but generally this structure will be dictated by resins with a low number of heteroatoms and high carbon content. Suitable resins are those of the formulae (I) and (II) respectively:

R—XH     (I)

POLYMER—R—XH     (II)

wherein X is oxygen, sulphur or nitrogen and R is aryl, imidoaryl, alkyl, alkenyl, alkynyl or heterocyclyl which may be optionally substituted.

In this specification "optionally substituted" means a group that may or may not be further substituted with one or more groups selected from alkyl, alkenyl, alkynyl, aryl, halo, haloalkyl, haloalkenyl, haloalkynyl, haloaryl, hydroxy, alkoxy, alkenyloxy, alkynyloxy, aryloxy, carboxy, benzyloxy haloalkoxy, haloalkenyloxy, haloalkynyloxy, haloaryloxy, nitro, nitroalkyl, nitroalkenyl, nitroalkynyl, nitroaryl, nitroheterocyclyl, azido, amino, alkylamino, alkenylamino, alkynylamino, arylamino, benzylamino, acyl, alkenylacyl, alkynylacyl, arylacyl, acylamino, acyloxy, aldehydo, alkylsulphonyl, arylsulphonyl, alkylsulphonylamino, arylsulphonylamino, alkylsulphonyloxy, arylsulphonyloxy, heterocyclyl, heterocycloxy, heterocyclylamino, haloheterocyclyl, alkylsulphenyl, arylsulphenyl, carboalkoxy, carboaryloxy, mercapto, alkylthio, arylthio, acylthio and the like.

Organic resins components having hydroxyl groups such as those of the formulae (I) and (II) above wherein X is oxygen and R is optionally substituted aryl, for example, phenolic resins or substituted phenolic resins are preferred. Suitable phenolic resins include phenol-aldehyde type resins such as phenol-formaldehyde type resins, for example, resole or novolac and phenolic imide or phenolic polyimide. It will be appreciated that the phenolic resins may be substituted with any non-deleterious substituent including alkyl, for example, methyl or t-butyl; or imide, for example, maleimide or succinimide.

The desirable composite will have a heteroatom, such as nitrogen in the system from polymer or crosslinker or solvent. This can be done by using an organic binder having nitrogen, such as polymide; crosslinker, such as HMTA; or a solvent, such as pyridine.

The term "polymer composite" is used herein in its broadest sense and refers to the combination of an organic resin component with another material, such as, for example, other polymers, particulate matter and/or additives known in the polymer art. It will be appreciated that one or more of the other materials may be inert or chemically reactive. The polymers may be selected from those defined above and can be in the form of a solution, dispersions, fibers or particles. The additives may include crosslinkers such as hexamine which is also known as hexamethylene tetramine (HMTA), polymerisation promoters, catalysts, soaps, wetting agents, accelerators, hardeners and sources of formaldehyde such as formalin, paraform or trioxane. Suitable polymer composites include novolac-HMTA, novalac-furfuryl alcohol(FA)-HMTA, resole-novolac-HMTA, resole-carbon, resole-carbon-novolac-HMTA-FA,novolac-HMTA-FA-carbon, novolac-HMTA-FA-carbon-TiB$_2$, resole-carbon-alumina-silica, carbon-TiB$_2$-resole, imidophenol-HMTA, poly(N-(hydroxyphenyl)maleimides)-HMTA and polyimide-novolac. A preferred polymer composite is novolac-FA-HMTA.

The mesophase carbon can be in the form of fibers, pellets, platelets or powder. The powder form can be obtained by pulverising the mesophase in a ball mill. As discussed above, the mesophase may be derived synthetically from aromatic hydrocarbons such as naphthalene. Examples include 100% anisotropic mesophase derived from naphthalen. The 100% anisotropic naphthalene may be prepared by cationic oligomerisation catalysed by HF/BF$_3$. The mesophase may be untreated or pre-treated by heating generally up to about 600° C.

The selection of filler particles largely depends upon the intended use of the carbon containing material. Examples of particulate matter include coated or uncoated fibers, platelets, pigments, fillers, polyesters, metallic mesh, silicon oxides, graphite, carbon black, carbides or nitrides and inorganic material such as aluminium, magnesia, zirconia, bauxite, clay, alumina, titanium diboride, zirconium diboride or titanium oxide. For instance, the inclusion of titanium diboride fillers provides a carbon material which can be used as a wetted cathode in advanced aluminium reduction cells.

The organic resin component, polymer composite and/or mesophase carbon may be presented in the form of a slurry, suspension or dispersion. The solvent used in the slurry, suspension or dispersion can be inert or chemically reactive and may contribute to the properties of the organic resin component or polymer composite. It is often advantageous for the solvent or its reaction products to be incorporated into the polymer derived carbon. This also reduces the loss of weight of the organic resin component or polymer composite on curing. The choice of solvent will depend on the type of organic resin component, polymer composite and/or mesophase carbon employed. An example of such a solvent is furfuryl alcohol. Other solvents include water or organic solvents such as aromatics, for example, toluene or benzene; ketones, for example, methyl ethyl ketone; alcohols, for example, FA or glycol (G); esters; ethers, for example, tetrahydrofuran (THF) or dioxane; or mixtures thereof.

Other additives known in the polymer art such as those defined above may also be included in the organic resin component, polymer composite and/or mesophase carbon mixture. In a preferred embodiment, the mesophase carbon is combined with a solution of novolac/HMTA/FA.

The binder phase may be mixed with the mesophase carbon in step (a) of the method of the invention using any suitable known apparatus, such as, for example, an Eirich mixer. The mixture of the binder phase and the mesophase carbon is generally cured at temperatures up to about 205° C. Curing is normally carried out under atmospheric pressure but can employ vacuum assistance or use elevated pressure in autoclaves to either draw off or retain more volatile species in specific mixtures. The cured mixture is then heated or pyrolysed in step (c) at temperatures sufficient to carbonise the material to a suitable form. This occurs at temperatures above about 800° C. but higher temperatures may be employed to further improve the structure and chemical stability. In certain applications, the final temperature can be as high as about 2000° C. The choice of temperature in part depends on the composition and properties of any filler particles, and on the desired end use.

The carbon-containing material of the present invention has many desirable properties including controlled surface area, high density, good mechanical strength, Strain to Failure (StF) values and anti-corrosion properties. For example, the carbon-containing material may have a total surface area of 20 m$^2$/g (Langmuir method) which gives excellent anti-corrosion, a high mechanical strength of about 60 MPa after curing and about 58 MPa after heating, a high carbon density of more than about 1.4 g/cm$^3$ and improved oxidation resistance with the oxidation temperature under O$_2$ being higher than about 570° C.

These desirable properties enable the carbon-containing material of the present invention to have various industrial applications. High performance carbon materials having anti-corrosion properties are often required by the refractory industry to form cathodes in aluminium reduction cells or bricks in steel making vessels. On the other hand, good mechanical and anti-oxidation properties of carbon materials are important in the products used in steel processing.

Thus, the present invention also extends to articles manufactured from the carbon-containing material, made from ferrous and non ferrous materials, glasses and ceramics, for example, steel fabrication equipment such as slide gates or valves, tap hole blockers and blast furnace linings, electrolytic cells used in aluminium production and other engineering products such as thermal protection barriers, aerospace components and aircraft, satellite and space craft structures.

The method used to prepare the carbon-containing material of the present invention is simple and the precursors of the binder phase and the mesophase carbon are commercially available and cheap. Accordingly, the present invention has the capability of producing a high performance material in an efficient and economical way.

The invention will now be described with reference to the following examples. These examples are not to be construed as limiting the invention in any way.

In the examples, reference will be made to the accompanying drawings in which.

Figure 5:
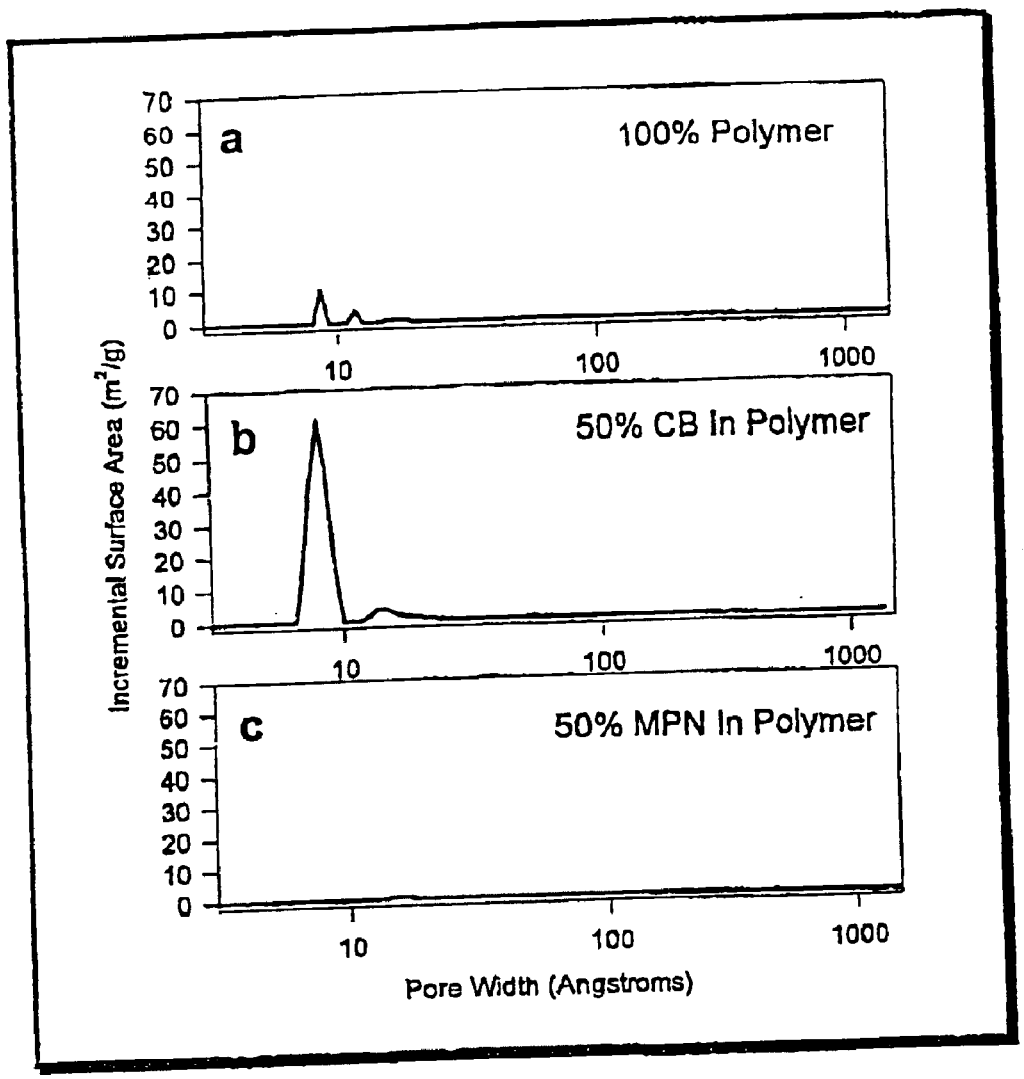
Figure 6:
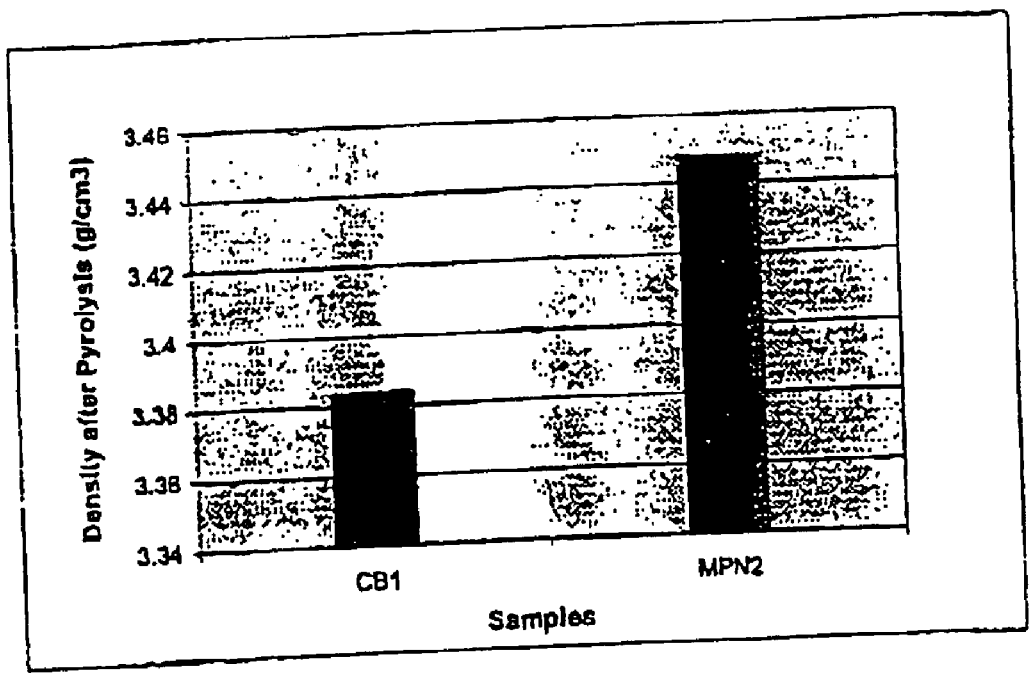

FIG. 5 is three graphs showing (a) pore size distribution of carbon made from 100% polymer after pyrolysis to 1000° C., (b) pore size distribution of carbon made from 50% CB in polymer after pyrolysis to 1000° C. and (c) pore size distribution of carbon made from 50% MPN in polymer after pyrolysis to 1000° C.; and FIG. 6 is a graph comparing carbon densities from composites made using an additive of carbon black (CB) and mesophase (MPN) in a material containing titanium diboride filler particles.

EXAMPLE 1

A mesophase pitch synthesised from naphthalene by catalytic reduction with $HF/BF_3$ is pre-heated under constant argon flow (7 ml/min). The pre-heating program used was 50° C./h to 500° C., keeping at that temperature for 1 hour followed by further 50° C./h to 600° C. The pre-treated mesophase was then pulverised with a ball mill for 1 min into powder before being blended with novolac resin with HMTA as the crosslinker in the solvent FA. The ratio of novolac/HMTA/FA was 40/8/52. Various samples with different ratios of resin and mesophase were prepared using this method and subsequently cured to 205° C. over approximately 30 hrs at atmospheric pressure.

The cured composites were then pyrolysed to 1000° C. at a rate of 50° C./h under an argon flow at 7 ml/min. The carbon-containing material produced was subsequently pulverised into a grain before various property tests were conducted.

Figure 1:
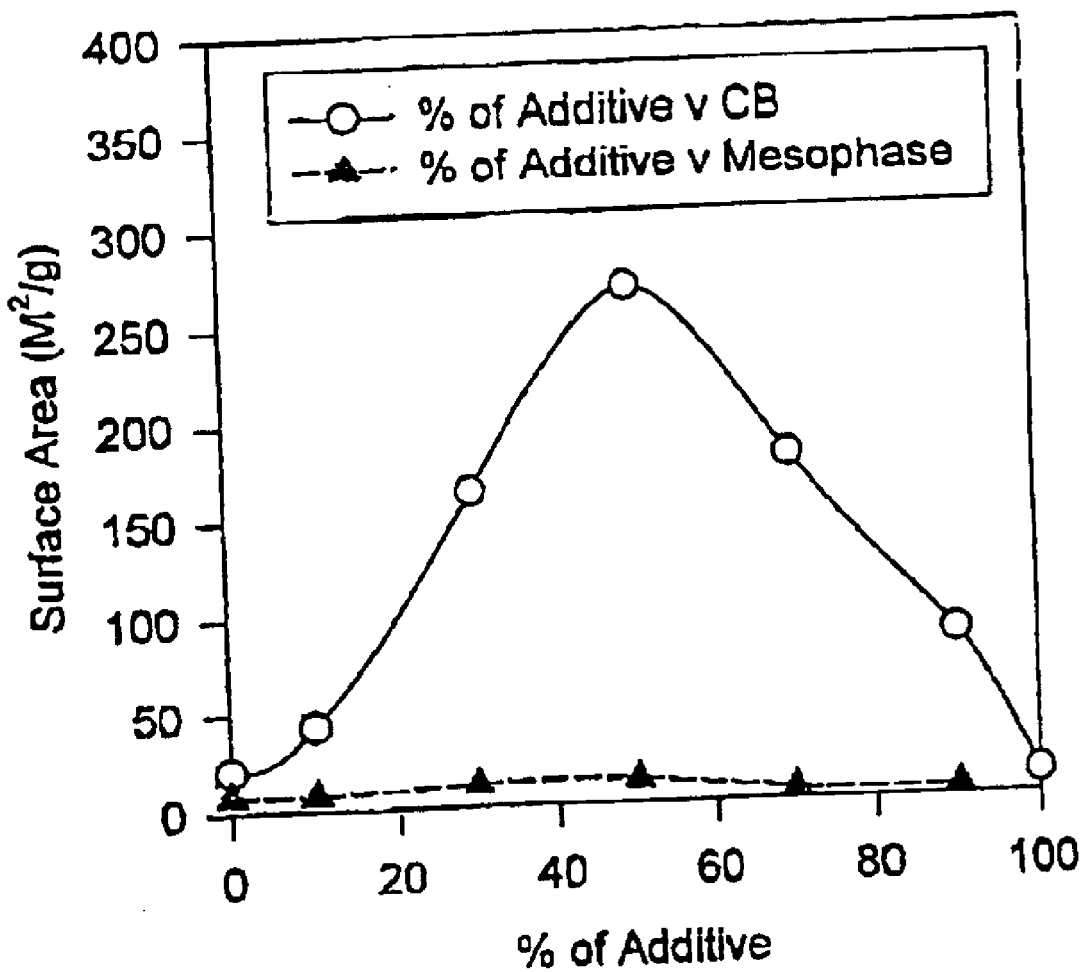
FIG. 1 is a graph showing a comparison between the surface areas of carbon materials containing mesophase and carbon black.

FIG. 1 shows the surface area of these carbon samples compared with samples prepared using the same methods, but where the mesophase was replaced by carbon black (CB). The surface area was obtained by measuring with $N_2$ at 77 K using a Langmuir Equation. The results show that, unlike the carbon black as a filler, the mesophase/resin system produces a low porosity carbon-containing material.

EXAMPLE 2

The pre-treated mesophase obtained in Example 1 was mixed with a novolac/HMTA (40/8 in ratio) resin powder in various amounts. 1 g of each mixed sample was then cold moulded into a block having the dimensions of 13 mm in diameter and 5–6 mm in thickness. The pressure used in moulding was 400 kg/cm$^2$. The blocks were then cured and carbonised as described in Example 1. The bulk densities of the blocks after moulding, curing and carbonisation were calculated by measuring their dimension and weight.

Figure 2:
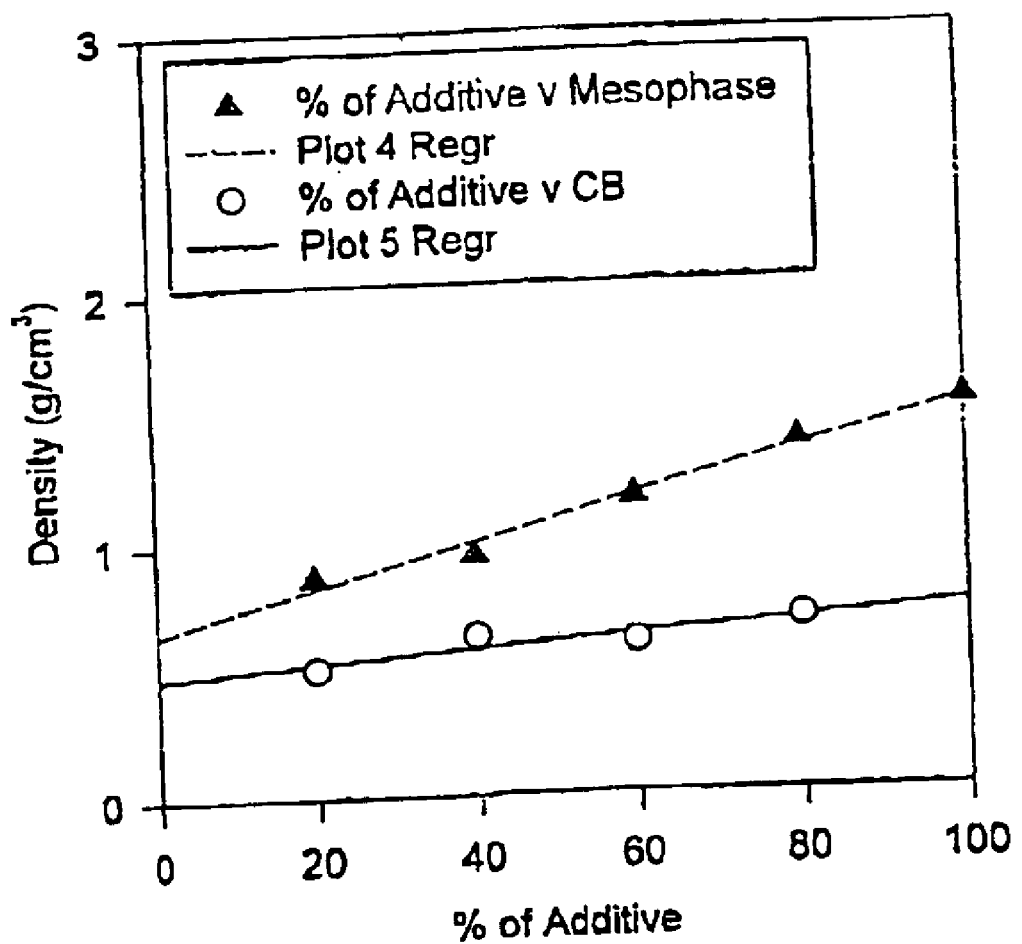
FIG. 2 is a graph showing a comparison between the densities of carbon materials containing mesophase and carbon black.
Figure 3:
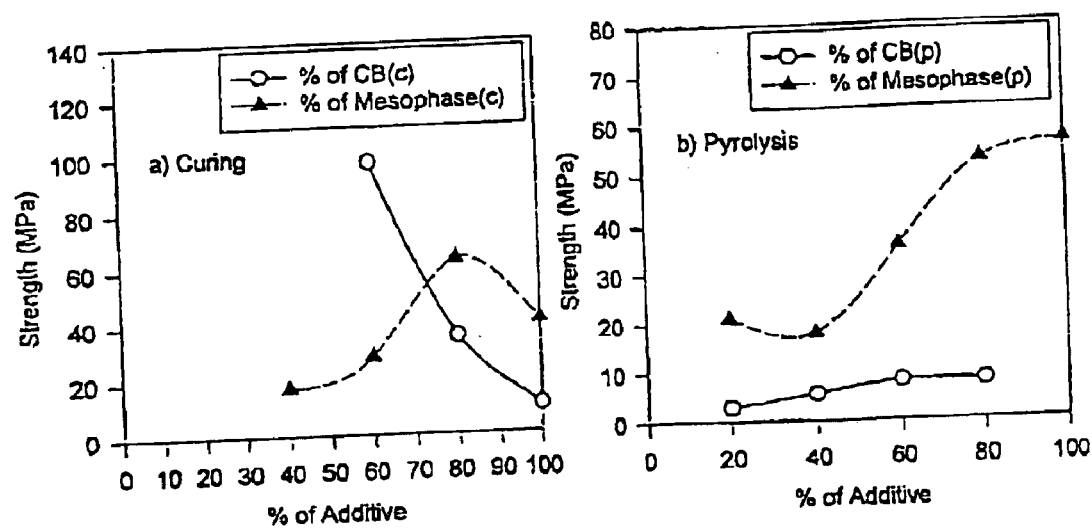
FIG. 3 is two graphs showing a comparison between the maximum strength of carbon materials containing mesophase and carbon black after (a) curing and (b) heating.

FIG. 2 shows that final carbon densities are higher with resins blended with mesophase compared to those blended with carbon black produced in the same way. Such high density results in a high strength in the mechanical tests as shown in FIGS. 3a and 3b. After curing, the maximum strength of the blocks were similar in the range of additive to about 70 to 90% with both mesophase and carbon black derived blocks. However, pyrolysed blocks in the same range have a much higher maximum strain when mesophase is blended with the resin. The carbon black blended carbon material has a poor mechanical strength after pyrolysis.

The surface area measurement of the samples pulverised from the blocks resulted in the similar effects observed in Example 1.

EXAMPLE 3

The effects of carbon material derived from other sources, but not mesophase were also tested with a novolac resin. The novolac/HMTA/FA system described in Example 1 was blended with 50% of carbon powder pulverised from other carbon sources. These carbon sources include pulverised graphite, carbon obtained from the pyrolysis of pure novolac/HMTA/FA to 1000° C. and carbon of the same pure resin after pre-treatment using the profile described in Example 1. The resulting mixtures were then cured and pyrolysed to 1000° C. as described in Example 1. Table 1 shows that these carbon sources have similar effects to carbon black on the porosity of the final formed carbon/carbon composite.

Different types of mesophase were tested under the same conditions and the results are shown in Table 1 below. The other mesophase carbon used was mesophase carbon derived from naphthalene without pre-treatment. Table 1 indicates that this mesophase carbon has a similar effect on the porosity of the final formed carbon materials as the pre-treated mesophase. The pyrolysis weight loss is also much higher.

TABLE 1

Effect of other carbon fillers on the carbon material formation from a novolac/HMTA/FA mixed system

| | 50% Carbon Black | 50% pre-treated mesophase | 50% graphite | 50% resin carbon | 50% pre-treated resin | 50% un-treated mesophase |
|---|---|---|---|---|---|---|
| Cure Weight Loss (%) | 11 | 12 | 10 | 19 | 12 | 11 |
| Pyrolysis Weight Loss (%) | 18 | 25 | 19 | 25 | 21 | 35 |
| Surface Area (m$^2$/g) | 266 | 33 | 46 | 266 | 215 | 12 |

EXAMPLE 4

Figure 4A:
FIG. 4 is six scanning electron microscope (SEM) images of composites having resin and (a)–(c) carbon black and (d)–(f) mesophase.
Figure 4D:
Figure 4B:
Figure 4E:
Figure 4C:
Figure 4F:

The novolac/HMTA/FA system described in Example 1 was blended with 50% carbon black or 50% treated mesophase powder pulverized by a ball mill method. The composites formed with this method were then cured and pyrolysed to 1000° C. as described in Example 1 being subjected to scanning electron microscopy (SEM) as shown in FIG. 4. FIGS. 4a to 4c are the SEM images of the composite having 50% carbon black resin with different amplification. FIGS. 4d to 4f are the equivalent images of the composite having 50% mesophase and resin. As shown in the figures, the images with resin/carbon black composites appears as a non-homogeneous form where the carbon black powder can be clearly identified. On the other hand, the image of the block from the resin/mesophase composite gives a uniform material, indicating a strong interaction between resin and mesophase during curing and pyrolysis.

EXAMPLE 5

The novolac/HMTA/FA system described in Example 1 was blended with the powder of 50% carbon black (CB) or 50% mesophase (MPN), respectively. These powders were made by pulverization within a ball mill. The formed composites, together with pure resin, were cured and pyrolysed to 1000° C. as described in Example 1. The resultant carbon and carbon composites were degassed under an argon flow at 400° C. for 48 hours followed by full isotherm adsorption measurements with nitrogen at 77 K using a ASAP 2010 surface analyzer. A DFT plus software supplied with the analyzer then calculated the measured full isotherm curves to provide the pore size distributions. FIG. 5 shows the pore size distributions calculated from these tested samples.

The carbons derived from pure resin polymer gave a low surface area of 21 m$^2$/g and no significant micropores appeared in the distribution, as shown in FIG. 5(a). However, when 50% carbon black was mixed with the resin, the measured surface area increased to 266 m$^2$/g as shown in Table 1 above and this porosity is mainly contributed by micropores (8–10 Å pore width, FIG. 5(b)). Assuming that the low surface area carbon black (~10 m²/g) did not become porous during the pyrolysis based on the results in FIG. 1, the huge porosity from the composites with CB was obviously due to the effect of adding carbon black to the resin polymer during its carbonization. When 50% MPN was used, this additive did not create any significant micropores in the carbons derived from polymer (FIG. 5(c)). Therefore, using MPN to replace CB as an additive in the composite avoids the formation of micropores in carbon derived from polymer.

EXAMPLE 6

Two types of cement were formed by mixing of 24% of novolac, 34% of furfuryl alcohol, 4.6% of HMTA and 37.4% of two different additives: carbon black and mesophase, respectively. 6.5% of each of these two cements was then mixed, respectively, with 93.5% titanium diboride (TiB$_2$). Two batches of 5.1 kg of each mixture were then compacted in a vibroformer make a lab block of the size about 150×150×60 mm. The pressure used to compact the block was standard pressure of 200 psi×50 followed by vibration forming at ~100 psi. The densities of the formed lab blocks and their saturation values are given in Table 2 below.

TABLE 2

Physical data of tested lab blocks after compaction and pyrolysis

| Sample Name | CB1 | CB2 | MPN1 | MPN2 |
|---|---|---|---|---|
| Density after compaction (g/cm³) | 3.45 | 3.54 | 3.52 | 3.52 |
| Saturation after compaction (%) | 90.0 | 92.4 | 91.8 | 91.8 |
| Shrinkage after pyrolysis (%) | 0.03 | −0.19 | −0.35 | −0.31 |
| Weight Loss after pyrolysis (%) | 1.95 | 1.95 | 2.27 | 2.30 |

These blocks were then cured to 205° C. in an oven, and pyrolysed to 1000° C. while the blocks were packed in petroleum coke. The total weight losses after pyrolysis were similar for both types of composites and there was no obvious size shrinkage observed from these blocks (Table 2). However, the density of the carbon composite made with MPN as an additive has a value of 3.44 g/cm³ compared with the value of 3.38 g/cm³ of the composite using carbon block as an additive (FIG. 6).

EXAMPLE 7

Each of the 4 lab blocks of the carbon composites obtained in Example 6 was cut in half and then sectioned into 6 strength bars having a size of 25×30×150 mm. These bars were then subjected to a three points bend test. Table 3 below gives the results from these mechanical tests.

TABLE 3

Mechanical test results from 3 points bend test for the composites made using CB and MPN as additives

| Samples | CB | MPN |
|---|---|---|
| Strength (MPa) (average of 8 bars from the center of the composite) | 2.71 | 6.57 |
| Young's Modulus (MPa) (average of 8 bars) | 715 | 1630 |

TABLE 3-continued

Mechanical test results from 3 points bend test for the composites made using CB and MPN as additives

| Samples | CB | MPN |
|---|---|---|
| Strain to Failure (StF) (%) | 0.38 | 0.40 |

The results show that the composites made using MPN as an additive have approximately double the mechanical strength of the composites using CB as an additive. This result is in agreement with the result of the composites formed by polymer/additive only system (Example 2). The Young's Modulus of MPN sample also increased from 715 to 1630 MPa compared to the CB sample. Although the Young's Modulus has increased, the Strain to Failure of MPN sample has also increased from 0.38% to 0.4% highlighting the improved mechanical properties.

EXAMPLE 8

The lab blocks of carbon composites obtained in Example 6 were cut into the standard size of 25×30×150 mm and then subjected to compression tests. Table 4 below shows the results of these tests.

TABLE 4

Mechanical test results from compression test for the composites made using CB and MPN as additives

| Samples | CB | MPN |
|---|---|---|
| Strength (MPa) (average of 6 samples) | 11.9 | 25.8 |
| Young's Modulus (MPa) (average of 6 samples) | 1057 | 1720 |

Similar to the observation in Example 7, the mechanical strength of the MPN sample is 2.5 times stronger than the sample of CB. The Young's Modulus also increased from 1057 to 1720 MPa.

We claim:

1. A composition suitable for the preparation of a carbon-containing material including:
   (i) a binder phase including an optionally substituted phenolic resin;
   (ii) synthetic mesophase carbon derived from aromatic hydrocarbons; and
   (iii) inorganic filler particles suitable for use as refractory material for high temperature applications.
2. A composition as claimed in claim 1 wherein the phenolic resin is a phenolaldehyde type resin.
3. A composition as claimed in claim 2 wherein the phenolaldehyde type resin is a phenolformaldehyde type resin.
4. A composition as claimed in claim 1 wherein the phenolic resin is selected from either resole or novolac and phenolic imide or phenolic polyamide or mixtures thereof.
5. A composition as claimed in claim 1 wherein the phenolic resin is substituted with alkyl or imide.
6. A composition as claimed in claim 5 wherein the alkyl is methyl or t-butyl.
7. A composition as claimed in claim 5 wherein the imide is maleimide or succinimide.
8. A composition as claimed in claim 1 where the refractory material is one or more of non-oxide refractory materials.

9. A composition as claimed in claim 8 wherein the non-oxide refractory material is boride, carbide and/or nitride.

10. A composition as claimed in claim 9 wherein the boride is titanium diboride and/or zirconium diboride.

11. A composition as claimed in claim 9 wherein the carbide is silicon carbide or titanium carbide.

12. A composition as claimed in claim 9 wherein the nitride is silicon nitride or aluminium nitride.

13. A composition as claimed in claim 1 further comprising an additive selected from the group consisting of crosslinkers, polymerization promoters, catalysts, soaps, wetting agents, accelerators, hardeners and/or sources of formaldehyde.

14. A composition as claimed in claim 13 wherein the crosslinker is hexamine (hexamethylene tetramine (HMTA)).

15. A composition as claimed in claim 13 wherein the source of formaldehyde is formalin, paraform or trioxane.

16. A composition as defined in claim 1 wherein the binder phase is selected from the group consisting of novolac-HMTA, novalac-furfuryl alcohol(FA)-HMTA, resole-novolac-HMTA, resole-carbon, resol-carbon-novolac-HMTA-FA, novolac-HMTA-FA carbon, novolac-HMTA-FA-carbon-$TiB_2$, resole-carbon-alumina-silica, carbon-$TiB_2$ resole, imidophenol-HMTA, poly(N-(hydroxyphenyl) maleimides)-HMTA or polyimide-novolac.

17. A composition as defined in claim 16 wherein the binder phase is novolac-FA-HMTA.

18. A composition as claimed in claim 1 wherein the mesophase carbon is in the form of fibers, pellets, platelets or powder.

19. A composition as claimed in claim 1 wherein the mesophase carbon is 100% anisotropic mesophase derived from naphthalene.

20. A composition as claimed in claim 1 wherein the mesophase carbon is pre-treated by heating.

21. A composition as claimed in claim 1 wherein the polymer or polymer composite and/or mesophase carbon are presented in the form of a solution.

22. A composition as claimed in claim 21 wherein the solvent used in the solution is inert or chemically reactive.

23. A composition as claimed in claim 22 wherein the solvent is incorporated in the polymer or polymer composite.

24. A composition as claimed in claim 22 wherein the solvent is water or an organic solvent.

25. A composition as claimed in claim 24 wherein the organic solvent is an aromatic, ketone, alcohol, ester, ether or mixtures thereof.

26. A composition as claimed in claim 1 wherein other additives known in the polymer art are included in the polymer, polymer composite and/or synthetic mesophase carbon mixture.

27. A composition as claimed in claim 21 wherein the mesophase carbon is combined with a solution of novolac/HMTA/FA.

28. A method for preparing a carbon-containing material including the steps of:
(a) mixing a binder phase containing an organic resin component or polymer composite with synthetic mesophase carbon derived from aromatic hydrocarbons and inorganic filler particles suitable for use as refractory material for high temperature applications;
(b) curing the mixture; and
(c) carbonizing the cured mixture to above 800° C.

29. A method as claimed in claim 28 wherein the mixture of the binder phase and the mesophase carbon is cured at temperatures up to about 205° C. under pressure.

30. A method as claimed in claim 28 wherein the cured mixture is heated up to temperatures above about 800° C.

31. A method as claimed in claim 30 wherein the temperature is about 1000° C.

32. An article which is wholly or partly manufactured from the carbon-containing material defined in claim 1.

33. An article as claimed in claim 32 which is steel fabrication equipment or other engineering products.

34. An article as claimed in claim 33 wherein the steel fabrication equipment is slide gates or valves, tap hole blockers or blast furnace linings.

35. An article as claimed in claim 34 which is used as part of an electrode in the electrolytic production of metals.

36. An article as claimed in claim 35 wherein the metals are aluminum and/or magnesium.

37. An article as claimed in claim 32 which is used as a refractory liner in furnaces used for high temperature processing of materials.

38. An article as claimed in claim 37 wherein the materials are ferrous and non-ferrous metals, glasses and ceramics.

39. An article as claimed in claim 33 wherein the engineering product is thermal protection barriers, aerospace components or aircraft, satellite or space craft structures.

40. A composition for the preparation of a carbon-containing material including:
(i) a binder phase including a phenolic resin substituted with alkyl and/or imide;
(ii) synthetic mesophase carbon derived from aromatic hydrocarbons; and
(iii) inorganic filler particles suitable for use as refractory material for high temperature applications.

41. The composition as claimed in claim 40 wherein the alkyl is methyl or t-butyl.

42. The composition as claimed in claim 40 wherein the imide is maleimide or succinimide.

43. The composition of claim 40 wherein the mesophase carbon is 100% anisotropic mesophase derived from naphthalene.

44. The composition of claim 40 wherein the binder and/or mesophase carbon are presented in the form of a solution.

45. The composition of claim 44 wherein the solvent used in the solution is inert or chemically reactive.

46. The composition of claim 45 wherein the solvent is incorporated in the binder or mesophase carbon.

47. The composition of claim 46 wherein the organic solvent is an aromatic, ketone, alcohol, ester, ether or mixtures thereof.

48. The composition of claim 44 wherein mesophase carbon is combined with a solution of novolac/HMTA-FA.

49. A method for preparing a carbon containing material including the steps of:
(a) mixing a binder phase containing an organic resin component or polymer composite with synthetic mesophase carbon and inorganic particles suitable for use as refractory material for high temperature applications;
(b) curing the mixture of the binder phase and mesophase carbon at temperatures up to about 205° C. under pressure; and
(c) carbonizing the cured mixture to about 800° C.

* * * * *